United States Patent
Yoshikawa et al.

(10) Patent No.: US 12,503,161 B2
(45) Date of Patent: Dec. 23, 2025

(54) CRAWLER-TYPE WORK MACHINE

(71) Applicant: KOMATSU LTD., Tokyo (JP)

(72) Inventors: Takeshi Yoshikawa, Tokyo (JP); Hiroaki Takeshima, Tokyo (JP); Naoya Akiyama, Tokyo (JP); Toshikazu Okada, Tokyo (JP); Kazushi Nakata, Tokyo (JP); Osamu Yatsuda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 420 days.

(21) Appl. No.: 18/253,830

(22) PCT Filed: Dec. 3, 2021

(86) PCT No.: PCT/JP2021/044477
§ 371 (c)(1),
(2) Date: May 22, 2023

(87) PCT Pub. No.: WO2022/158138
PCT Pub. Date: Jul. 28, 2022

(65) Prior Publication Data
US 2024/0001989 A1     Jan. 4, 2024

(30) Foreign Application Priority Data
Jan. 21, 2021  (JP) ................. 2021-008065

(51) Int. Cl.
*B62D 11/18*  (2006.01)
*B62D 11/08*  (2006.01)
*E02F 9/22*   (2006.01)

(52) U.S. Cl.
CPC ............. *B62D 11/18* (2013.01); *B62D 11/08* (2013.01); *E02F 9/2267* (2013.01)

(58) Field of Classification Search
CPC ....... B62D 11/18; B62D 11/08; E02F 9/2267; B60W 10/20
See application file for complete search history.

(56) References Cited

U.S. PATENT DOCUMENTS

| | | |
|---|---|---|
| 2005/0183416 A1* | 8/2005 | Hayashi ................ E02F 9/2296 60/445 |
| 2013/0239560 A1 | 9/2013 | Kim et al. |

(Continued)

FOREIGN PATENT DOCUMENTS

| | | |
|---|---|---|
| CN | 1661235 A | 8/2005 |
| CN | 111094111 A | 5/2020 |

(Continued)

OTHER PUBLICATIONS

The International Search Report for the corresponding international application No. PCT/JP2021/044477, issued on Feb. 15, 2022.

(Continued)

*Primary Examiner* — Jason D Shanske
*Assistant Examiner* — Scott Lawrence Strickler
(74) *Attorney, Agent, or Firm* — GLOBAL IP COUNSELORS, LLP

(57) ABSTRACT

A controller of a crawler type work machine controls left and right steering clutches, left and right steering brakes, and a turning motor to cause the crawler type work machine to turn in either a slow turning mode or a pivot turning mode. The controller executes a hydraulic fluid amount control to reduce a hydraulic fluid amount supplied from a hydraulic pressure supply unit to the turning motor and to increase the hydraulic fluid amount supplied from the hydraulic pressure supply unit from the hydraulic pressure supply unit to the work implement cylinder when the work implement cylinder is driven while the turning motor is being rotated.

5 Claims, 4 Drawing Sheets

(56) References Cited

U.S. PATENT DOCUMENTS

| | | | |
|---|---|---|---|
| 2021/0285185 A1 | 9/2021 | Shirato et al. | |
| 2024/0001988 A1* | 1/2024 | Yoshikawa | ............... E02F 9/22 |
| 2025/0012043 A1* | 1/2025 | Yoshikawa | ............... E02F 9/02 |

FOREIGN PATENT DOCUMENTS

| | | | |
|---|---|---|---|
| JP | 53-27929 A | 3/1978 |
| JP | 2013-545948 A | 12/2013 |
| JP | 2019-65956 A | 4/2019 |
| JP | 2020-122270 A | 8/2020 |

OTHER PUBLICATIONS

First Office Action received for Chinese Application No. 202180072925.5, issued on Mar. 17, 2025, 13 pages. (English Translation Submitted).

\* cited by examiner

CRAWLER-TYPE WORK MACHINE

CROSS-REFERENCE TO RELATED APPLICATIONS

This application is a U.S. National stage application of International Application No. PCT/JP2021/044477, filed on Dec. 3, 2021. This U.S. National stage application claims priority under 35 U.S.C. § 119(a) to Japanese Patent Application No. 2021-008065, filed in Japan on Jan. 21, 2021, the entire contents of which are hereby incorporated herein by reference.

BACKGROUND

Technical Field

The present disclosure relates to a crawler-type work machine.

Background Information

Conventionally, there is known a crawler-type work machine (for example, a bulldozer or the like) that comprises left and right planetary gear mechanisms, left and right hydraulic drive steering clutches, left and right hydraulic drive steering brakes, and a turning motor (see Japanese Patent Laid-open No. S53-27929).

The left and right planetary gear mechanisms are disposed between an input shaft and left and right output shafts. The left and right steering clutches are able to rotate about the input shaft and switch between transmitting and blocking rotational power from the input shaft to the left and right output shafts by means of the left and right planetary gear mechanisms. The left and right steering brakes brake the left and right output shafts. The turning motor causes the left and right steering clutches to rotate so that a rotation speed difference is produced between the left and right output shafts.

The crawler-type work machine described in Japanese Patent Laid-open No. S53-27929 turns in a slow turning mode by causing the left and right steering clutches to engage, causing the left and right steering brakes to disengage, and driving the turning motor.

The crawler-type work machine described in Japanese Patent Laid-open No. S53-27929 turns in a pivot turning mode by causing the inside steering clutch to disengage and causing the inside steering brake to brake.

SUMMARY

The turning motor described in Japanese Patent Laid-open No. S53-27929 is driven by hydraulic pressure discharged from a variable discharge pressure pump (referred to below as "turning motor pump") that is driven with the power of the engine. However, Japanese Patent Laid-open No. S53-27929 does not discuss the situation when the crawler-type work machine is provided with a work implement.

Specifically, in the condition where the turning motor is driven by the turning motor pump, there is a concern that the operability of the work implement will be reduced because the power of the engine that can be allocated to the work implement decreases.

An object of the present disclosure is to provide a crawler-type work machine with which a reduction in the operability of the work implement can be suppressed.

A crawler-type work machine according to an aspect of the present disclosure comprises left and right planetary gear mechanisms, left and right steering clutches, left and right steering brakes, a turning motor, work implement cylinders, a hydraulic pressure supply unit, and a controller. The left and right planetary gear mechanisms are disposed between an input shaft and left and right output shafts. The left and right steering clutches are configured to rotate about the input shaft and switch between transmitting and blocking rotational power from the input shaft to the left and right output shafts by means of the left and right planetary gear mechanisms. The left and right steering brakes are configured to brake the left and right output shafts. The turning motor is configured to cause the left and right steering clutches to rotate so that a rotation speed difference is produced between the left and right output shafts. The work implement cylinders are configured to drive a work implement attached to a vehicle body. The hydraulic pressure supply unit is configured to supply hydraulic fluid to the turning motor and the work implement cylinders. The controller is configured to control the left and right steering clutches, the left and right steering brakes, and the turning motor thereby causing the crawler-type work machine to turn in either a slow turning mode or a pivot turning mode. The controller is configured to execute a hydraulic fluid amount control to reduce the hydraulic fluid amount supplied from the hydraulic pressure supply unit to the turning motor and to increase the hydraulic fluid amount supplied from the hydraulic pressure supply unit to the work implement cylinder when the work implement cylinders are driven while the turning motor is being rotated.

According to the feature of the present disclosure, there can be provided a crawler-type work machine with which a reduction in the operability of the work implement can be suppressed.

DETAILED DESCRIPTION OF EMBODIMENT(S)

(Configuration of Appearance of Bulldozer 1)

Figure 1:
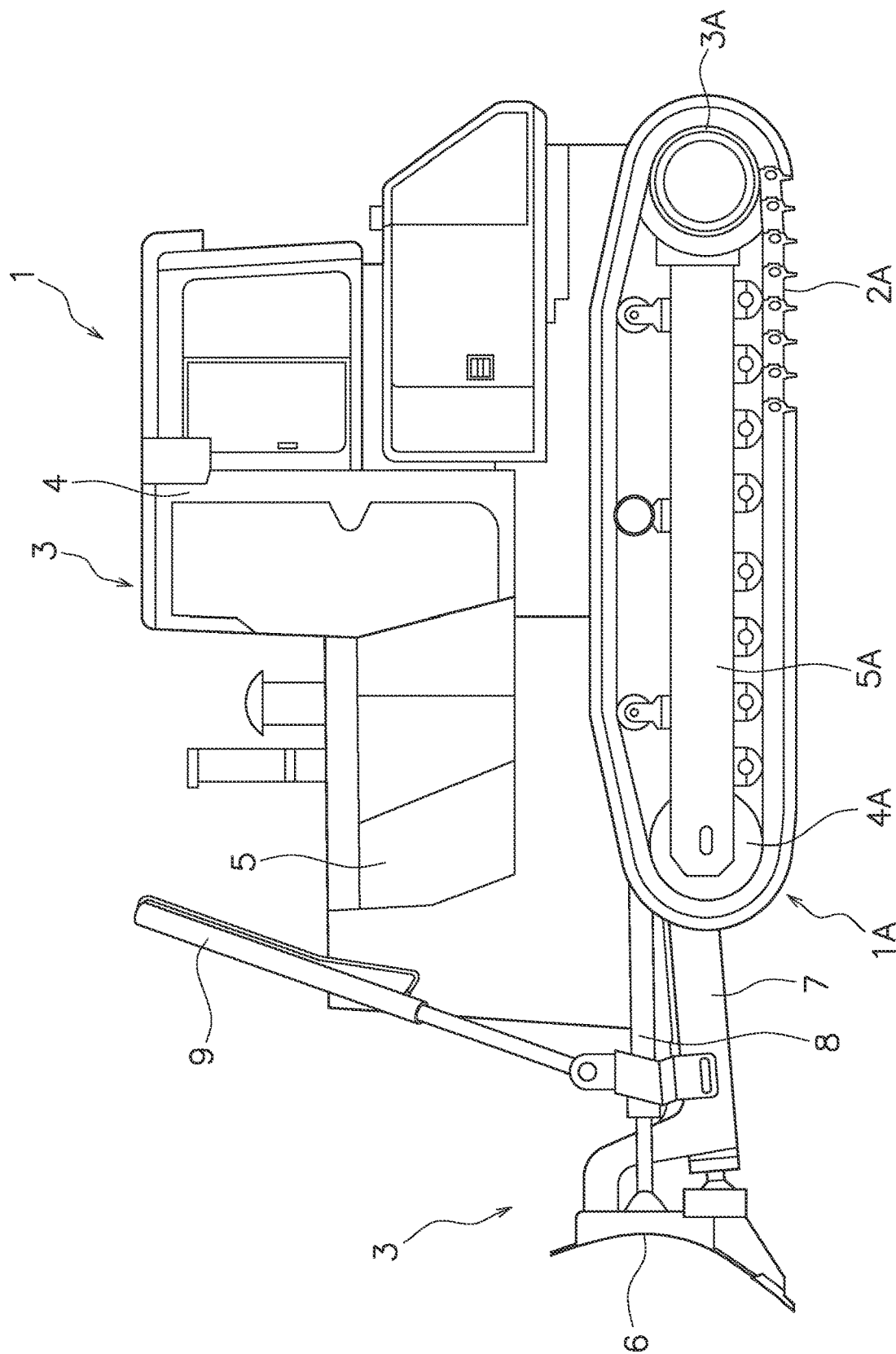
FIG. 1 is a perspective view of a bulldozer according to an embodiment.

FIG. 1 is a perspective view of a bulldozer 1 that is an example of the crawler-type work machine.

As illustrated in FIG. 1, the bulldozer 1 comprises a vehicle body 2, a work device 3, and a pair of left and right crawler belt devices 1A.

The vehicle body 2 has a cab 4, an engine room 5, and a vehicle body frame (not illustrated). The cab 4 is disposed in a rear upper part of the vehicle body 2. The engine room 5 is disposed in front of the cab 4.

The work device 3 is attached to the vehicle body 2. The work device 3 has a blade 6, a frame 7, angle cylinders 8, and lift cylinders 9. The blade 6 is an example of a "work implement" according to the present disclosure The blade 6 is disposed in front of the vehicle body 2. The blade 6 is supported by the frame 7. The front end of the frame 7 is rotatably attached to the rear surface of the blade 6. The rear end of the frame 7 is rotatably supported on the side surfaces of the vehicle body 2.

The blade 6 is driven by the angle cylinders 8 and the lift cylinders 9. The angle cylinders 8 and the lift cylinders 9 are each example of "work implement cylinders" according to the present disclosure.

The front ends of the angle cylinders 8 are rotatably supported on the rear surface of the blade 6. The rear ends of the angle cylinders 8 are rotatably supported on the side surfaces of the vehicle body 2. The blade 6 is tilted in the front-back direction due to the extension and contraction of the angle cylinders 8 by hydraulic pressure.

The lower ends of the lift cylinders 9 are rotatably supported on the upper surface of the frame 7. The middle sections of the lift cylinders 9 are rotatably supported on the side surfaces of the vehicle body 2. The blade 6 moves in the up-down direction due to the extension and contraction of the angle cylinders 9 by hydraulic pressure.

The pair of left and right crawler belt devices 1A are travel devices of the bulldozer 1. The pair of left and right crawler belt devices 1A are disposed on both sides of the vehicle body 2.

Each of the pair of left and right crawler belt devices 1A have a crawler belt 2A, a drive wheel (sprocket) 3A, an idler wheel (idler) 4A, and a track frame 5A.

The crawler belt 2A is configured in a circular shape (endless shape) and is wound onto the drive wheel 3A and the idler wheel 4A. The crawler belt 2A meshes with the drive wheel 3A and rotates due to the rotational power of the drive wheel 3A.

The drive wheel 3A and the track frame 5A are both attached to side sections of the vehicle body 2. The drive wheel 3A is disposed so as to allow for rotational driving at the rear of the track frame 5A. The idler wheel 4A is rotatably disposed at a front end section of the track frame 5A.

(Internal Configuration of Bulldozer 1)

Figure 2:
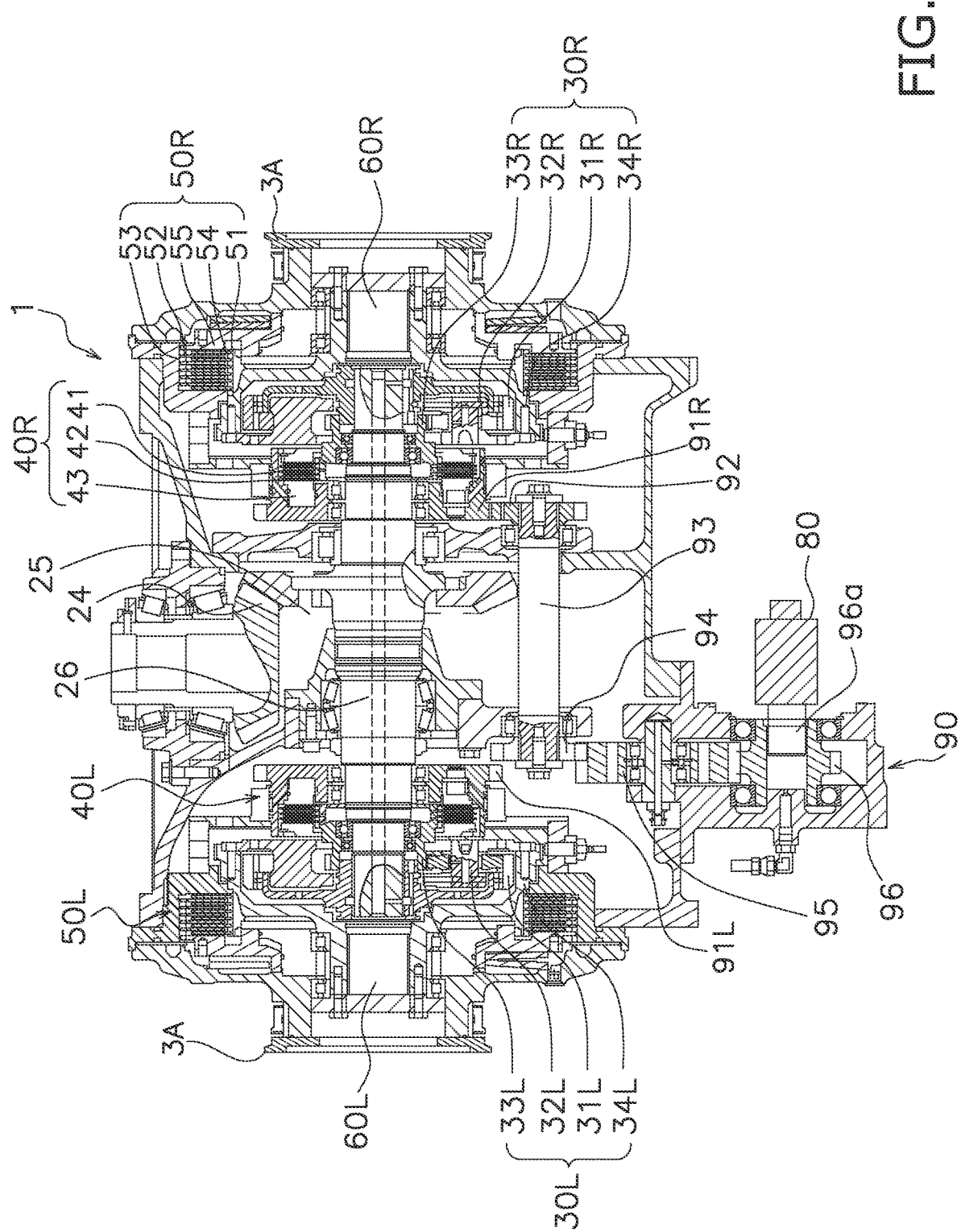
FIG. 2 is a cross-sectional configuration view of a power transmission system of the bulldozer according to the embodiment.
Figure 3:
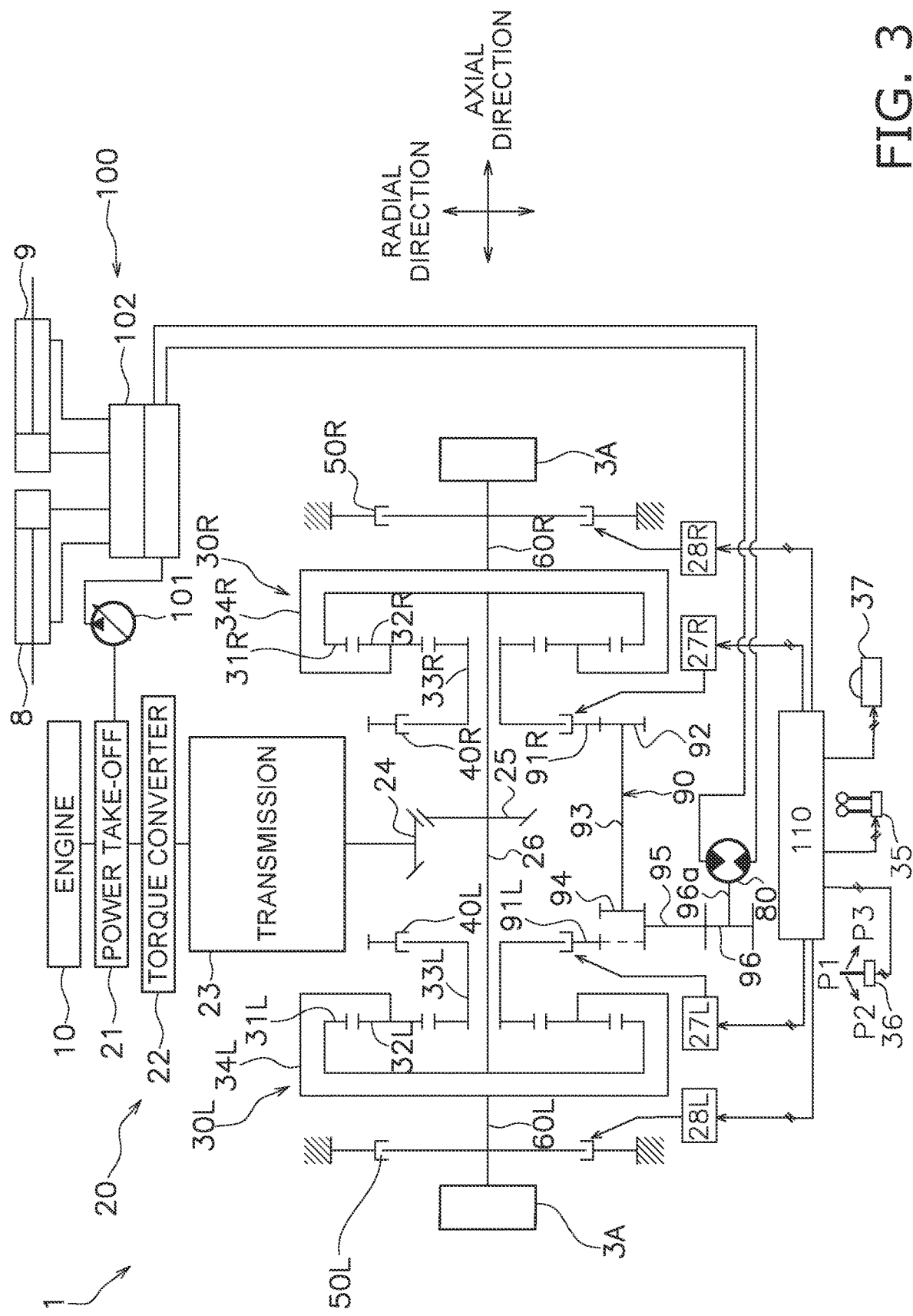
FIG. 3 is an outline system configuration view of the power transmission system of the bulldozer according to the embodiment.

FIG. 2 is a cross-sectional configuration diagram of the power transmission system of the bulldozer 1. FIG. 3 is an outline system configuration view of the power transmission system of the bulldozer 1.

As illustrated in FIGS. 2 and 3, the bulldozer 1 includes the engine 10, an engine power transmitting unit 20, left and right planetary gear mechanisms 30L, 30R, left and right steering clutches 40L, 40R, left and right steering brakes 50L, 50R, left and right output shafts 60L, 60R, a turning motor 80, a motor power transmitting unit 90, a hydraulic pressure supply unit 100, and a controller 110.

(Engine Power Transmitting Unit)

The engine power transmitting unit 20 transmits power from the engine 10 to the left and right planetary gear mechanisms 30L, 30R. The engine power transmitting unit 20 includes a power take-off device 21, a torque converter 22, a transmission 23, a pinion 24, a bevel gear 25, and an input shaft 26.

The power take-off device 21 distributes the power of the engine 10 to the torque converter 22 and a below mentioned variable capacity pump 101. The torque converter 22 transmits the power of the engine 10 transmitted by the power take-off device 21 to the transmission 23 by means of a fluid. The transmission 23 has a plurality of velocity stage clutches for changing the rotation power transmitted from the torque converter 22, and a direction stage clutch for switching between forward travel and reverse travel. The transmission 23 is coupled to the pinion 24. The power from the transmission 23 is transmitted through the pinion 24 and the bevel gear 25 to the input shaft 26. The input shaft 26 extends in the left-right direction. The axial direction of the input shaft 26 has the same meaning as the left-right direction of the bulldozer 1.

(Planetary Gear Mechanism)

The left and right planetary gear mechanisms 30L, 30R are disposed between the input shaft 26 and the left and right output shafts 60L, 60R. The left and right planetary gear mechanisms 30L, 30R respectively have left and right ring gears 31L, 31R, left and right planetary gears 32L, 32R, left and right sun gears 33L, 33R, and left and right carriers 34L, 34R.

The left and right ring gears 31L, 31R are coupled to the input shaft 26. The left and right planetary gears 32L, 32R are respectively disposed on the inside of the left and right ring gears 31L, 31R in a radial direction perpendicular to the axial direction of the input shaft 26. The left and right planetary gears 32L, 32R respectively mesh with the left and right ring gears 31L, 31R and the left and right sun gears 33L, 33R. The left and right sun gears 33L, 33R are rotatably attached to the input shaft 26. The left and right sun gears 33L, 33R are respectively disposed on the inside of the left and right planetary gears 32L, 32R in the radial direction. The left and right sun gears 33L, 33R are respectively coupled to the left and right steering clutches 40L, 40R. The left and right sun gears 33L, 33R are able to separate from the motor power transmitting unit 90 (specifically, below mentioned left and right clutch gears 91L, 91R) through the left and right steering clutches 40L, 40R. The left and right carriers 34L, 34R are respectively coupled to the left and right planetary gears 32L, 32R and the left and right output shafts 60L, 60R.

(Steering Clutch)

The left and right steering clutches 40L, 40R are respectively disposed between the left and right planetary gear mechanisms 30L, 30R and the motor power transmitting unit 90. The left and right steering clutches 40L, 40R respectively disengage from the left and right sun gears 33L, 33R of the left and right planetary gear mechanisms 30L, 30R and from the left and right clutch gears 91L, 91R of the motor power transmitting unit 90.

The left and right steering clutches 40L, 40R are driven by the supply of hydraulic fluid. The left and right steering clutches 40L, 40R are configured by wet multiplate clutches that can be engaged and disengaged. In the present embodiment, the left and right steering clutches 40L, 40R are positive-type hydraulic clutches. The left and right steering clutches 40L, 40R are disengaged when hydraulic fluid is not supplied, are partially engaged when the pressure of the supplied hydraulic fluid is less than a predetermined value, and are completely engaged when the pressure of the supplied hydraulic fluid is equal to or greater than the predetermined value.

The pressure of the hydraulic fluid supplied to the left and right steering clutches 40L, 40R is controlled by the steering clutch control valves 27L, 27R. The left and right clutch control valves 27L, 27R are driven in response to a clutch hydraulic pressure instruction inputted from the controller 110.

The left and right steering clutches 40L, 40R switch between transmitting and blocking the rotational force from the input shaft 26 to the respective left and right output shafts 60L, 60R by means of the respective left and right planetary gear mechanisms 30L, 30R.

Specifically, the rotation of the input shaft 26 is transmitted through the left ring gear 31L, the left planetary gear 32L, and the left carrier 34L to the left output shaft 60L when the left steering clutch 40L is engaged. Conversely, when the left steering clutch 40L is disengaged, the left sun gear 33L enters a freely rotating state and the transmission of the rotation power from the input shaft 26 to the left output shaft 60L is blocked. Similarly, the transmission or blocking of the rotation power from the input shaft 26 to the right output shaft 60R is switched in response to the engagement or disengagement of the right steering clutch 40R.

The left and right steering clutches 40L, 40R are able to rotate about the input shaft 26. The left and right steering clutches 40L, 40R rotate in mutually opposite directions due to the rotation power from the turning motor 80 being transmitted through the motor power transmitting unit 90.

For example, when the right steering clutch 40R rotates in reverse while the left steering clutch 40L rotates in the forward direction while the left and right steering clutches 40L, 40R are engaged, the rotation speed of the left output shaft 60L increases more than the rotation speed of the right output shaft 60R and the bulldozer 1 turns slowly to the right.

In the present description, slow turning signifies that forward travel or reverse travel occurs such that an arc is drawn with a relatively large turning radius due to the rotation speed difference produced between the left and right output shafts 60L, 60R that rotate in the same direction.

In addition, when the left steering clutch 40L rotates in the forward direction while the left steering clutch 40L is engaged and the right steering clutch 40R is disengaged, the rotation of the right output shaft 60R is stopped and the left output shaft 60L rotates whereby the bulldozer 1 makes a pivot turn to the right. However, when the bulldozer 1 makes a pivot turn to the right, the right steering brake 50R brakes the right output shaft 60R as discussed below.

In the present description, a pivot turn signifies turning using the crawler belt on the other side as an axis due to one of the left and right output shafts 60L, 60R being substantially or completely stopped while the other is rotating.

As illustrated in FIG. 2, the right steering clutch 40R has a plurality of clutch plates 41, a plurality of clutch disks 42, and a clutch piston 43.

The clutch plates 41 are attached to a right clutch gear 91R. The clutch disks 42 are fixed to the right sun gear 33R. The clutch plates 41 and the clutch disks 42 are disposed alternately in the axial direction.

When the clutch piston 43 moves in the left direction accompanying the supply of hydraulic fluid, the clutch plates 41 and the clutch disks 42 are pressed together and the right steering clutch 40R is engaged. Consequently, the right sun gear 33R of the right planetary gear mechanism 30R and the right clutch gear 91R of the motor power transmitting unit 90 are joined together.

When the clutch piston 43 moves in the right direction accompanying the discharge of hydraulic fluid, the clutch plates 41 and the clutch disks 42 separate and the right steering clutch 40R is disengaged. Consequently, the right sun gear 33R of the right planetary gear mechanism 30R and the right clutch gear 91R of the motor power transmitting unit 90 move away from each other.

The left steering clutch 40L has the same configuration as the right steering clutch 40R.

(Steering Brake)

The left and right steering brakes 50L, 50R are driven by the supply of hydraulic fluid. The left and right steering brakes 50L, 50R are configured by wet multiplate clutches that can be engaged and disengaged. In the present embodiment, the left and right steering brakes 50L, 50R are negative-type hydraulic brakes. The left and right steering brakes 50L, 50R are completely engaged when hydraulic fluid is not supplied, are partially engaged when the pressure of the supplied hydraulic fluid is less than a predetermined value, and are disengaged when the pressure of the supplied hydraulic fluid is equal to or greater than the predetermined value. When the left and right steering brakes 50L, 50R are engaged (complete engagement or partial engagement), a braking force is produced on the left and right steering brakes 50L, 50R.

The pressure of the hydraulic fluid supplied to the left and right steering brakes 50L, 50R is controlled by left and right brake control valves 28L, 28R. The left and right brake control valves 28L, 28R are driven in response to a brake hydraulic pressure instruction inputted from the controller 101.

The left and right steering brakes 50L, 50R respectively brake the rotation of the left and right output shafts 60L, 60R.

Specifically, when the left steering brake 50L is engaged, braking is applied to the rotation of the left output shaft 60L and the rotation of the left sprocket 2L is reduced. Conversely, when the right steering brake 50R is engaged, braking is applied to the rotation of the right output shaft 60R and the rotation of the right sprocket 2R is reduced.

As illustrated in FIG. 2, the right steering brake 50R has a rotating member 51, a brake housing 52, a plurality of fixing plates 53, a plurality of brake disks 54, and a brake piston 55.

The rotating member 51 is fixed to the right output shaft 60R and rotates with the right output shaft 60R. The brake housing 52 is fixed to the rotating member 51. The fixing plates 53 are attached to the brake housing 52. The brake disks 54 are fixed to the rotating member 51. The fixing plates 53 and the brake disks 54 are disposed alternately in the axial direction.

When the brake piston 55 moves in the left direction accompanying the filling of hydraulic fluid, the fixing plates 53 and the brake disks 54 separate and the right steering brake 50R is disengaged. Conversely, when the brake piston 55 moves in the right direction accompanying the discharge of hydraulic fluid, the fixing plates 53 and the brake disks 54 are pressed together and the braking force of the right steering brake 50R is produced.

The left steering brake 50L has the same configuration as the right steering brake 50R.

(Turning Motor)

The turning motor 80 is driven by power from the engine 10. The turning motor 80 rotates in the forward rotating direction or the reverse rotating direction. The rotating direction and the rotation speed of the turning motor 80 are controlled by the controller 110. The rotation speed of the turning motor 80 changes from 0% to 100% (maximum value) in accordance with the power transmitted from the engine 10.

The rotation power of the turning motor 80 is transmitted through the motor power transmitting unit 90 to the left and right steering clutches 40L, 40R. The turning motor 80 causes the left and right steering clutches 40L, 40R to rotate so that a rotation speed difference is produced between the left and right output shafts 60L, 60R. For example, when the bulldozer 1 turns slowly to the right, the turning motor 80 causes the left and right steering clutches 40L, 40R to rotate so that the rotation speed of the left output shaft 60L becomes higher than the rotation speed of the right output shaft 60R. When the bulldozer 1 is making a pivot turn to the right, the turning motor 80 causes the left and right steering clutches 40L, 40R to rotate in opposite directions so that the right output shaft 60R does not rotate and only the left output shaft 60L rotates.

(Motor Power Transmitting Unit)

The motor power transmitting unit 90 is disposed between the turning motor 80 and the left and right steering clutches 40L, 40R. The motor power transmitting unit 90 transmits the rotation power of the turning motor 80 to the left and right steering clutches 40L, 40R.

The motor power transmitting unit 90 has left and right clutch gears 91L, 91R, a first transfer gear 92, an auxiliary shaft 93, a second transfer gear 94, an idler gear 95, and a pinion gear 96.

The left and right clutch gears 91L, 91R are able to separate from the left and right sun gears 33L, 33R by means of the left and right steering clutches 40L, 40R. The left and right clutch gears 91L, 91R are able to rotate about the axial direction of the input shaft 26. The left clutch gear 91L meshes with the idler gear 95. The right clutch gear 91R is coupled to the first transfer gear 92, the auxiliary shaft 93, and the second transfer gear 94 through the idler gear 95. The left and right clutch gears 91L, 91R rotate in opposite directions when the turning motor 80 rotates.

The idler gear 95 meshes with the left clutch gear 91L, the second transfer gear 94, and the pinion gear 96. The idler gear 95 is able to rotate about the axial direction of the input shaft 26.

The pinion gear 96 meshes with the idler gear 95. The pinion gear 96 is able to rotate about a pinion shaft 96a. The pinion gear 96 rotates due to the rotation power of the turning motor 80 that is transmitted through the pinion shaft 96a.

(Hydraulic Pressure Supply Unit)

The hydraulic pressure supply unit 100 supplies hydraulic fluid to the angle cylinders 8, the lift cylinders 9, and the turning motor 80. The hydraulic pressure supply unit 100 has the variable capacity pump 101 and a control valve 102.

The variable capacity pump 101 is an example of a "hydraulic pump" according to the present disclosure. The variable capacity pump 101 is coupled to the power take-off device 21. The variable capacity pump 101 is driven by power from the engine 10 transmitted from the power take-off device 21.

The variable capacity pump 101 discharges hydraulic fluid to the control valve 102. The discharge amount from the variable capacity pump 101 is changed in accordance with the tilt angle of a skew plate provided inside the variable capacity pump 101. The tilt angle of the skew plate is controlled by the controller 110.

The control valve 102 is respectively connected to the variable capacity pump 101, the angle cylinders 8, the lift cylinders 9, and the turning motor 80 by means of pipes. The control valve 102 distributes hydraulic fluid discharged from the variable capacity pump 101 to the variable capacity pump 101, the angle cylinders 8, and the lift cylinders 9.

The amount of hydraulic fluid supplied from the control valve 102 to the angle cylinders 8 is changed in accordance with the position of an angle cylinder spool provided inside the control valve 102. The amount of hydraulic fluid supplied from the control valve 102 to the lift cylinders 9 is changed in accordance with the position of a lift cylinder spool provided inside the control valve 102. The amount of hydraulic fluid supplied from the control valve 102 to the turning motor 80 is changed in accordance with the position of a turning motor spool provided inside the control valve 102. The respective positions of the angle cylinder spool, the lift cylinder spool, and the turning motor spool are controlled by the controller 110.

(Controller)

The controller 110 controls the rotation speed of the engine 10 and the velocity stage clutches and the direction stage clutches of the transmission 23 in order to cause the bulldozer 1 to travel.

The controller 110 is connected to a work implement lever 35 used in a driving operation of the blade 6. An angle lever for tilting the blade 6 in the front-back direction and a lift lever for lifting the blade 6 in the up-down direction are included in the work implement lever 35. The controller 110 outputs control signals to the variable capacity pump 101 and the control valve 102 in response to the operating amount and the operating direction of the work implement lever 35.

The controller 110 is connected to a steering lever 36 used for steering operations of the bulldozer 1. The controller 110 outputs control signals to the left and right clutch control valves 27L, 27R, the left and right brake control valves 28L, 28R, the variable capacity pump 101, and the control valve 102 in response to the operating amount of the steering lever 36.

The steering lever 36 can be operated in a left turning direction P2 or a right turning direction P3 using a neutral position P1 as a point of reference. The controller 110 controls the left and right steering clutches 40L, 40R, the left and right steering brakes 50L, 50R, and the turning motor 80 in response to the operating direction and the operating amount of the steering lever 36 thereby causing the bulldozer 1 to travel in any of a "straight travel mode," a "slow turning mode," and a "pivot turning mode."

The controller 110 causes the bulldozer 1 to travel in the straight travel mode when the operating amount of the steering lever 36 is equal to or less than a first predetermined amount TH1. When the operating amount of the steering lever 36 is greater than the first predetermined amount TH1 and less than a second predetermined amount TH2, the controller 110 causes the bulldozer 1 to turn in the slow turning mode. When the operating amount of the steering lever 36 is equal to or greater than the second predetermined amount TH2, the controller 110 causes the bulldozer 1 to turn in the pivot turning mode.

The second predetermined amount TH2 is greater than the first predetermined amount TH1. The first and second predetermined amounts TH1 and TH2 can be set to desired values. The first predetermined amount TH1 may even be zero.

Straight Travel Mode

In the straight travel mode, the controller 110 controls the left and right clutch control valves 27L, 27R to cause the left and right steering clutches 40L, 40R to completely engage.

In the straight travel mode, the controller 110 controls the left and right brake control valves 28L, 28R to cause the left and right steering brakes 50L, 50R to disengage.

In the straight travel mode, the controller 110 stops the turning motor 80.

Slow Turning Mode

In the slow turning mode, the controller 110 controls the left and right clutch control valves 27L, 27R to cause the left and right steering clutches 40L, 40R to engage (typically to be completely engaged).

In the slow turning mode, the controller 110 controls the left and right brake control valves 28L, 28R to cause the left and right steering brakes 50L, 50R to disengage.

In the slow turning mode, the controller 110 causes the turning motor 80 to be driven so that the rotation speed of an inside output shaft $60_{IN}$ is lower than the rotation speed of an outside output shaft $60_{OUT}$ in correspondence to an increase in the operating amount of the steering lever 36.

The inside output shaft $60_{IN}$ is the output shaft corresponding to the operating direction (that is, the turning direction) of the steering lever 36 among the left and right output shafts 60L, 60R. The outside output shaft $60_{OUT}$ is the output shaft in the direction opposite the operating direction of the steering lever 36 among the left and right output shafts 60L, 60R.

The controller 110 increases the rotation speed of the turning motor 80 in correspondence to an increase in the operating amount of the steering lever 36. For example, the controller 110 may increase the rotation speed of the turning motor 80 gradually so as to be proportional to the operating amount of the steering lever 36, or may increase the rotation speed of the turning motor 80 in stages in response to the operating amount of the steering lever 36.

While the rotation speed of the turning motor 80 when the operating amount of the steering lever 36 is the second predetermined amount TH2 is not limited in particular so long as the value is sufficiently high, the rotation speed is preferably at least 90%, more preferably at least 95%, and most preferably 100% (maximum value).

Pivot Turning Mode

In the pivot turning mode, the controller 110 controls the left and right clutch control valves 27L, 27R to cause an inside steering clutch $40_{IN}$ to disengage and cause an outside steering clutch $40_{OUT}$ to engage (typically to be completely engaged).

The inside steering clutch $40_{IN}$ is the steering clutch corresponding to the operating direction of the steering lever 36 among the left and right steering clutches 40L, 40R. The outside steering clutch $40_{OUT}$ is the steering clutch in the direction opposite the operating direction of the steering lever 36 among the left and right steering clutches 40L, 40R.

In the pivot turning mode, the controller 110 controls the left and right brake control valves 28L, 28R to cause an inside steering brake $50_{IN}$ to brake and cause an outside steering brake $50_{OUT}$ to disengage.

The inside steering brake $50_{IN}$ is the steering brake corresponding to the operating direction of the steering lever 36 among the left and right steering brakes 50L, 50R. The outside steering brake $50_{OUT}$ is the steering brake in the direction opposite the operating direction of the steering lever 36 among the left and right steering brakes 50L, 50R.

In the pivot turning mode, the controller 110 maintains the rotation speed of the turning motor 80 at about the same rotation speed as in the slow turning mode. While the rotation speed of the turning motor 80 is not limited in particular so long as the value is sufficiently high, the rotation speed is preferably at least 90%, more preferably at least 95%, and most preferably 100%.

Control of Hydraulic Fluid Amount in Pivot Turning Mode

The controller 110 is connected to a low-speed switch 37. The operator turns the low-speed switch 37 ON when driving the blade 6 during turning in the pivot turning mode. The operator turns the low-speed switch 37 OFF when not driving the blade 6 during turning in the pivot turning mode.

The controller 110 rotates the turning motor 80 as indicated above during turning in the pivot turning mode. When the low-speed switch 37 is ON in this situation, the controller 110 executes a "hydraulic fluid amount control" for reducing the hydraulic fluid amount supplied from the hydraulic pressure supply unit 100 to the turning motor 80 and increasing the hydraulic fluid amounts respectively supplied from the hydraulic pressure supply unit 100 to the angle cylinders 8 and the lift cylinders 9.

Specifically, the controller 110 outputs a control command to the control valve 102 to control the respective positions of the angle cylinder spool, the lift cylinder spool, and the turning motor spool thereby reducing the hydraulic fluid amount supplied from the control valve 102 to the turning motor 80 and increasing the hydraulic fluid amounts respectively supplied from the control valve 102 to the angle cylinders 8 and the lift cylinders 9. The controller 110 may control the angle cylinder spool, the lift cylinder spool, and the turning motor spool so as to be at previously set positions when executing the hydraulic fluid amount control.

According to this hydraulic fluid amount control, while the bulldozer 1 performs the pivot turn at a slow speed, a reduction in the operability (driving power and driving speed) of the blade 6 when the operator operates the work implement lever 35 can be suppressed.

The controller 110 may also set the hydraulic fluid amount supplied from the control valve 102 to the turning motor 80 to "0." While the turning speed of the bulldozer 1 decreases as the hydraulic fluid amount supplied from the control valve 102 to the turning motor 80 approaches "0," the operability of the work device 3 increases.

The controller 110 rotates the turning motor 80 as indicated above during turning in the slow turning mode. However, in the present embodiment, the controller 110 does not execute the hydraulic fluid amount control while turning in the slow turning mode. That is, the controller 110 does not reduce the hydraulic fluid amount supplied from the control valve 102 to the turning motor 80 even when the low-speed switch 37 is ON during turning in the slow turning mode. As a result, the turning radius of the bulldozer 1 becoming too large during slow turning can be suppressed.

MODIFIED EXAMPLES OF THE EMBODIMENT

The present invention is not limited to the above embodiment and various changes and modifications may be made without departing from the spirit of the invention.

Modified Example 1

While the bulldozer 1 is provided as an example of the crawler-type work machine in the above embodiment, the present invention can be widely applied to a crawler-type work machine having a crawler-type travel device such as a hydraulic excavator.

Modified Example 2

While the blade 6 is provided as an example of the work implement in the above embodiment, the present invention is not limited thereto. For example, a ripper used for crushing work or excavating work can be provided as an example of the work implement.

Modified Example 3

Figure 4:
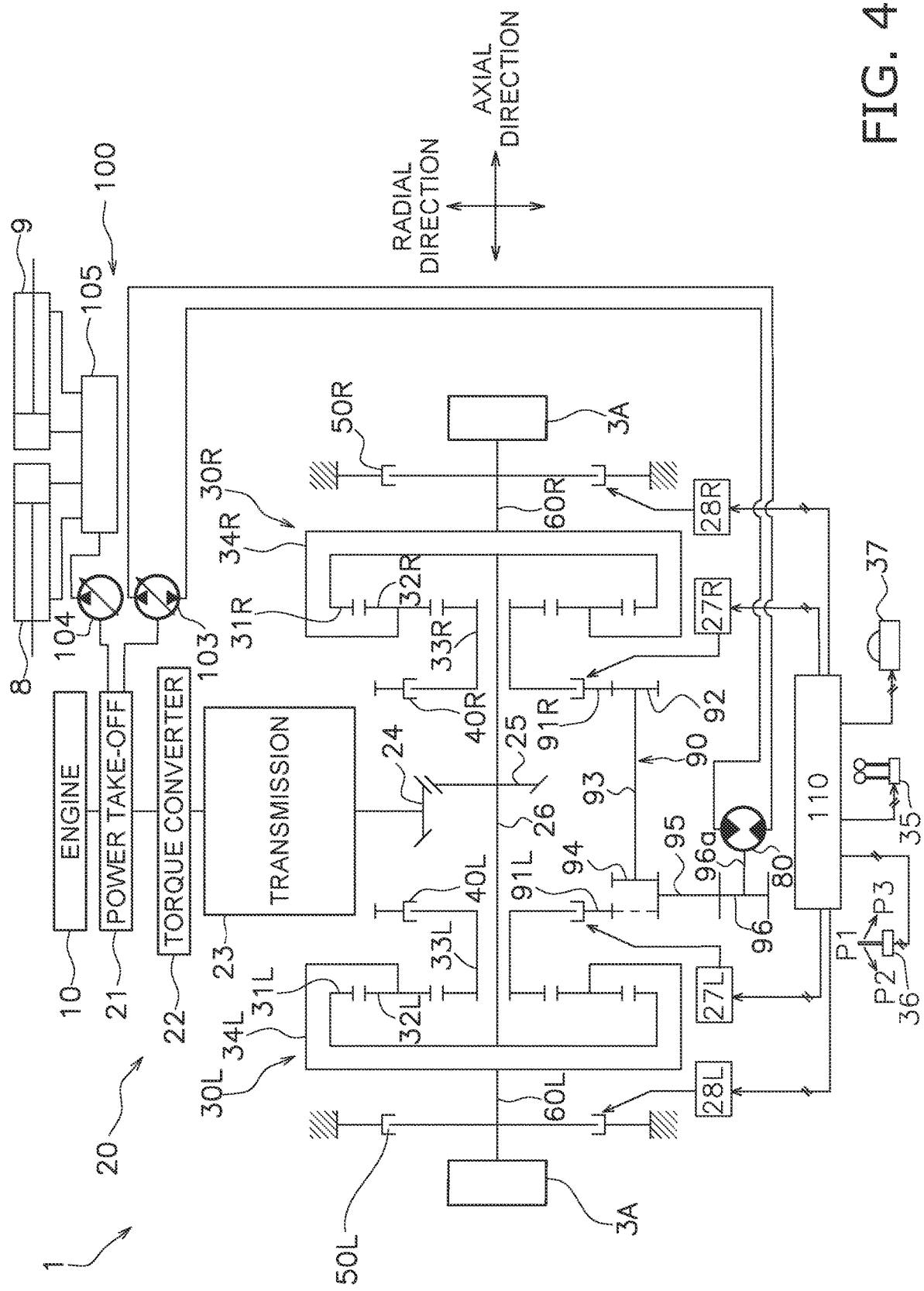
FIG. 4 is an outline system configuration view of the power transmission system of the bulldozer according to a third modified example.

The hydraulic pressure supply unit 100 in the above embodiment has the variable capacity pump 101 and the control valve 102, but is not limited thereto. As illustrated in FIG. 4, the hydraulic pressure supply unit 100 may individually include a turning motor hydraulic pump 103 that supplies hydraulic fluid to the turning motor 80, and a work implement hydraulic pump 104 that supplies hydraulic fluid to the angle cylinders 8 and the lift cylinders 9. In this case, the controller 110 is able to execute the hydraulic fluid amount control by controlling the skew plate of the turning motor hydraulic pump 103 and reducing the hydraulic fluid amount supplied from the turning motor hydraulic pump 103 to the turning motor 80, and increasing the hydraulic fluid amounts supplied to the angle cylinders 8 and the lift cylinders 9 from the work implement hydraulic pump 104 through a control valve 105.

Modified Example 4

While the controller 110 in the above embodiment may not execute the hydraulic fluid amount control while turning in the slow turning mode, the controller 110 may also execute the hydraulic fluid amount control while turning in the slow turning mode. In this case, a reduction in the operability of the blade 6 can be suppressed even during slow turning while the turning radius of the bulldozer 1 increases during slow turning.

The controller 110 may also execute the hydraulic fluid amount control only during turning in the slow turning mode without executing the hydraulic fluid amount control during turning in the pivot turning mode.

Modified Example 5

While the controller 110 in the above embodiment switches from the slow turning mode to the pivot turning mode in response to the operating amount of the steering lever 36 becoming equal to or greater than the second predetermined amount TH2, the present invention is not limited thereto. The controller 110 may switch from the slow turning mode to the pivot turning mode when the operating amount of the steering lever 36 is greater than the first predetermined amount TH1 and when the operator has turned a pivot turning button ON.

Modified Example 6

While the left and right steering clutches 40L, 40R are positive-type hydraulic clutches in the above embodiment, the left and right steering clutches 40L, 40R may also be negative-type hydraulic clutches.

Modified Example 7

While the left and right steering brakes 50L, 50R are negative-type hydraulic brakes in the above embodiment, the left and right steering brakes 50L, 50R may also be positive-type hydraulic brakes.

The invention claimed is:

1. A crawler-type work machine comprising:
   left and right planetary gear mechanisms disposed between an input shaft and left and right output shafts;
   left and right steering clutches configured to rotate about the input shaft and switch between transmitting and blocking rotational power from the input shaft to the left and right output shafts using the left and right planetary gear mechanisms;
   left and right steering brakes configured to brake the left and right output shafts;
   a turning motor configured to cause the left and right steering clutches to rotate so that a rotation speed difference is produced between the left and right output shafts;
   a work implement cylinder configured to drive a work implement attached to a vehicle body;
   a hydraulic pressure supply unit configured to supply hydraulic fluid to the turning motor and the work implement cylinder; and
   a controller configured to control the left and right steering clutches, the left and right steering brakes, and the turning motor to cause the crawler-type work machine to turn in either a slow turning mode or a pivot turning mode,
   the controller being configured to execute a hydraulic fluid amount control to reduce the hydraulic fluid amount supplied from the hydraulic pressure supply unit to the turning motor and to increase the hydraulic fluid amount supplied from the hydraulic pressure supply unit to the work implement cylinder when the work implement cylinder is driven while the turning motor is being rotated.

2. The crawler-type work machine according to claim 1, wherein
   the hydraulic pressure supply unit has
      a hydraulic pump that is driven by power from an engine and that discharges hydraulic fluid, and
      a control valve that distributes the hydraulic fluid discharged by the hydraulic pump to the turning motor and to the work implement cylinder, and
   the controller is configured to execute the hydraulic fluid amount control to reduce the hydraulic fluid amount supplied from the control valve to the turning motor and to increase the hydraulic fluid amount supplied from the control valve to the work implement cylinder when the work implement cylinder is driven while the turning motor is being rotated.

3. The crawler-type work machine according to claim 1, wherein
   the hydraulic pressure supply unit has
      a turning motor hydraulic pump that supplies hydraulic fluid to the turning motor, and
      a work implement hydraulic pump that supplies hydraulic fluid to the work implement cylinder, and
   the controller is configured to execute the hydraulic fluid amount control to reduce the hydraulic fluid amount supplied from the turning motor hydraulic pump to the turning motor and to increase the hydraulic fluid amount supplied from the work implement hydraulic pump to the work implement cylinder when the work implement cylinder is driven while the turning motor is being rotated.

4. The crawler-type work machine according to claim 1, wherein
   the controller is configured to execute the hydraulic fluid amount control while turning in the pivot turning mode without executing the hydraulic fluid amount control while turning in the slow turning mode.

5. The crawler-type work machine according to claim 1, further comprising:
   a low-speed switch,
   the controller being configured to execute the hydraulic fluid amount control when the low-speed switch is turned on.

* * * * *